(12) United States Patent
Miki et al.

(10) Patent No.: US 10,745,079 B2
(45) Date of Patent: Aug. 18, 2020

(54) BICYCLE COMPONENT CONTROL DEVICE

(71) Applicant: Shimano Inc., Sakai, Osaka (JP)

(72) Inventors: Yoshimitsu Miki, Osaka (JP); Kazutaka Fukao, Osaka (JP); Kentaro Kosaka, Osaka (JP)

(73) Assignee: Shimano Inc., Osaka (JP)

( * ) Notice: Subject to any disclaimer, the term of this patent is extended or adjusted under 35 U.S.C. 154(b) by 391 days.

(21) Appl. No.: 14/929,794

(22) Filed: Nov. 2, 2015

(65) Prior Publication Data

US 2016/0052592 A1 Feb. 25, 2016

Related U.S. Application Data

(60) Continuation of application No. 13/495,411, filed on Jun. 13, 2012, now Pat. No. 9,187,150, which is a division of application No. 13/195,050, filed on Aug. 1, 2011, now Pat. No. 10,144,483.

(51) Int. Cl.
*B62L 3/02* (2006.01)
*B62M 25/04* (2006.01)
*B62K 23/06* (2006.01)

(52) U.S. Cl.
CPC .............. *B62L 3/023* (2013.01); *B62K 23/06* (2013.01); *B62M 25/04* (2013.01); *Y10T 74/2003* (2015.01); *Y10T 74/20037* (2015.01); *Y10T 74/20396* (2015.01); *Y10T 74/20612* (2015.01)

(58) Field of Classification Search
CPC ......... B62L 3/023; B62M 25/04; B62K 23/06
See application file for complete search history.

(56) References Cited

U.S. PATENT DOCUMENTS

| | | |
|---|---|---|
| 3,993,174 A | 11/1976 | Williams et al. |
| 4,175,648 A | 11/1979 | Sule |
| 4,232,565 A | 11/1980 | Leonheart |
| 4,391,353 A | 7/1983 | Mathauser |
| 4,615,415 A | 10/1986 | Mathauser |
| 4,916,967 A | 4/1990 | Nakamura |
| 4,921,081 A | 5/1990 | Chilcote |
| 5,241,878 A | 9/1993 | Nagano |
| 5,257,683 A | 11/1993 | Romano |

(Continued)

FOREIGN PATENT DOCUMENTS

| | | |
|---|---|---|
| CN | 101712368 A | 5/2010 |
| CN | 1966345 B | 7/2010 |

(Continued)

OTHER PUBLICATIONS

Definition of Controller by Merriam-Webster, merriam-webster.com., Dec. 30, 2018 (Year: 2018).*

(Continued)

*Primary Examiner* — Vinh Luong
(74) *Attorney, Agent, or Firm* — Global IP Counselors, LLP (57) ABSTRACT

A bicycle component control device includes a bracket, a hydraulic brake unit and either a mechanical shifting unit or electric control unit. The bracket has a gripping portion. The hydraulic brake unit is operatively mounted on the bracket and configured to operate a hydraulic brake device. The mechanical shifting unit or the electric control unit is operatively mounted on the bracket and configured to operate a bicycle device.

16 Claims, 9 Drawing Sheets

(56) References Cited

U.S. PATENT DOCUMENTS

| | | | |
|---|---|---|---|
| 6,073,730 A | 6/2000 | Abe | |
| 6,651,523 B2 | 11/2003 | Chou | |
| 7,546,909 B2 | 6/2009 | Campbell et al. | |
| 7,650,813 B2 | 1/2010 | Tsumiyama | |
| 7,779,718 B2 | 8/2010 | Jordan et al. | |
| 8,201,670 B2 | 6/2012 | Tetsuka et al. | |
| 8,297,143 B2 | 10/2012 | Fujii et al. | |
| 8,464,844 B2 | 6/2013 | Jordan | |
| 8,550,942 B2 * | 10/2013 | Oda | B62K 23/06 474/80 |
| 8,714,322 B2 | 5/2014 | Dunlap et al. | |
| 9,321,501 B1 * | 4/2016 | Miki | B62K 23/06 |
| 2001/0012978 A1 | 8/2001 | Jinbo et al. | |
| 2004/0055840 A1 | 3/2004 | Lumpkin | |
| 2004/0211617 A1 | 10/2004 | Ogasawara et al. | |
| 2005/0109148 A1 | 5/2005 | Tsumiyama | |
| 2005/0145462 A1 * | 7/2005 | Uno | B62K 23/06 192/217 |
| 2005/0211014 A1 * | 9/2005 | Fujii | B62K 23/04 74/625 |
| 2007/0131495 A1 | 6/2007 | Matsushita et al. | |
| 2007/0131503 A1 | 6/2007 | Matsushita et al. | |
| 2007/0178715 A1 * | 8/2007 | Fujii | B62K 23/02 439/34 |
| 2007/0251780 A1 | 11/2007 | Lyons | |
| 2008/0072697 A1 * | 3/2008 | Fujii | B62K 23/02 74/471 R |
| 2008/0155982 A1 | 7/2008 | Jones et al. | |
| 2008/0168856 A1 * | 7/2008 | Tetsuka | B62K 23/06 74/502.2 |
| 2008/0295635 A1 | 12/2008 | Sato et al. | |
| 2008/0314191 A1 | 12/2008 | Miki et al. | |
| 2009/0031841 A1 | 2/2009 | Tetsuka | |
| 2009/0114051 A1 | 5/2009 | Miki | |
| 2009/0139361 A1 | 6/2009 | Watarai | |
| 2009/0165591 A1 | 7/2009 | Kawakami | |
| 2009/0235772 A1 | 9/2009 | Naka et al. | |
| 2010/0064838 A1 | 3/2010 | Siew et al. | |
| 2010/0083786 A1 | 4/2010 | Miki et al. | |
| 2010/0083788 A1 | 4/2010 | Jordan et al. | |
| 2010/0186538 A1 | 7/2010 | Tetsuka | |
| 2010/0199798 A1 | 8/2010 | Uno | |
| 2011/0031078 A1 | 2/2011 | Matsushita et al. | |
| 2011/0079103 A1 | 4/2011 | Kususe et al. | |
| 2011/0147149 A1 | 6/2011 | Tetsuka et al. | |
| 2012/0040715 A1 | 2/2012 | Fu et al. | |
| 2012/0160625 A1 | 6/2012 | Jordan | |
| 2014/0144275 A1 | 5/2014 | Kariyama et al. | |
| 2015/0151812 A1 * | 6/2015 | Miki | B62M 25/04 74/502.2 |
| 2015/0291247 A1 * | 10/2015 | Fukao | B62K 23/06 74/473.14 |
| 2015/0367908 A1 * | 12/2015 | Kariyama | B60T 17/04 188/72.4 |
| 2018/0057104 A1 * | 3/2018 | Komatsu | B62K 23/06 |
| 2018/0304960 A1 * | 10/2018 | Komada | B62K 23/06 |
| 2018/0312212 A1 * | 11/2018 | Hara | B62K 23/06 |

FOREIGN PATENT DOCUMENTS

| | | | |
|---|---|---|---|
| CN | 102101516 A | 6/2011 | |
| DE | 60 2004 010007 T2 | 9/2008 | |
| DE | 10 2013100668 A1 | 10/2013 | |
| EP | 1 325 863 B1 | 12/2002 | |
| EP | 1 724 189 B1 | 12/2009 | |
| EP | 2 281 741 A2 | 1/2010 | |
| EP | 1 997 723 B1 | 9/2010 | |
| EP | 2230129 A2 | 9/2010 | |
| JP | 2008 074402 A | 4/2008 | |
| TW | I267595 B | 12/2006 | |
| TW | I286523 B | 9/2007 | |
| TW | I299312 B | 8/2008 | |
| TW | M359489 U | 6/2009 | |
| TW | 200932619 A | 8/2009 | |
| TW | 201041777 A | 12/2010 | |
| TW | M412125 U | 3/2011 | |
| TW | 201307119 A | 2/2013 | |
| WO | WO 2009/011110 A1 * | 1/2009 | B62L 3/023 |

OTHER PUBLICATIONS

Define controller—Google Search, google.com., Dec. 30, 2018 (Year: 2018).*
Define electric device—Google Search, Jul. 11, 2019 (Year: 2019).*
Define communication Google Search, Jul. 19, 2019. (Year: 2019).*
Define bicycle electric device—Images, Google Search, Jul. 11, 2019 (Year: 2019).*
Images of electric controller—Google Search, Dec. 8, 2019 (Year: 2019).*
Electric control / Article about electric control by The Free Dictionary, Dec. 8, 2019 (Year: 2019).*
Define electronic controller—Google Search, Dec. 8, 2019 (Year: 2019).*
www.merriam-webster.com/dictionary/seam; Oct. 5, 2014.
en.wiktionary.org/wiki/seam; Oct. 5, 2014.
Notice of Opposition of corresponding EP patent Application No. 12 17 8653.7 dated Dec. 19, 2016.

* cited by examiner

BICYCLE COMPONENT CONTROL DEVICE

CROSS-REFERENCE TO RELATED APPLICATIONS

This application is a continuation application of U.S. patent application Ser. No. 13/495,411, filed on Jun. 13, 2012, which in turn is a divisional application of U.S. patent application Ser. No. 13/195,050, filed on Aug. 1, 2011. The entire disclosures of U.S. patent application Ser. Nos. 13/495,411 and 13/195,050 are hereby incorporated herein by reference.

BACKGROUND

Field of the Invention

This invention generally relates to a bicycle component control device. More specifically, the present invention relates to a bicycle component control device having a hydraulic brake unit in combination with an electric control unit.

Background Information

Bicycles typically include one or more bicycle component control devices for controlling various bicycle components such as a hydraulic brake device or a gear changing device. Some of these bicycle component control devices have a bracket with an interior space that houses a bicycle component operating unit. The bicycle component operating unit is often provided with one or more operating levers that extend out of the bracket such that the rider can operate the bicycle component operating unit. One example of bicycle component control devices having this type of configuration are disclosed in U.S. patent application Publication No. 2011/0079103.

SUMMARY

In accordance with one aspect presented in this disclosure, a bicycle component control device is proposed that basically comprises a bracket, a mechanical shifting unit and a hydraulic brake unit. The bracket has a gripping portion. The mechanical shifting unit is operatively mounted on the bracket and configured to operate a gear shifting device. The hydraulic brake unit is operatively mounted on the bracket and configured to operate a hydraulic brake device.

In accordance with another aspect presented in this disclosure, a bicycle component control device is proposed that basically comprises a bracket, an operating member, a hydraulic brake unit and an electric control unit. The bracket has a distal end portion, a proximal end portion and a gripping portion arranged between the distal end portion and the proximal end portion. The proximal end portion has a mounting surface facing a bicycle handlebar. The operating member is pivotally attached to the distal end portion of the bracket about a pivot axis. The hydraulic brake unit is operatively mounted on the bracket and configured to operate a hydraulic brake device. The hydraulic brake unit has a piston member that is moved toward the mounting surface in response to operation of the operating member. The electric control unit is operatively mounted on at least one of the bracket and the operating member to operate a bicycle electric device.

In accordance with yet another aspect presented in this disclosure, a bicycle component control device is proposed that basically comprises a bracket, an operating member, a hydraulic brake unit and an electric control unit. The bracket has a gripping portion. The operating member is pivotally attached to the bracket about a pivot axis. The hydraulic brake unit is operatively mounted on the bracket and configured to operate a hydraulic brake device. The hydraulic brake unit has a master cylinder located rearward of the pivot axis of the operating member while the bicycle component control device is in an installed position. The electric control unit is operatively mounted on at least one of the bracket and the operating member to operate a bicycle electric device.

These and other objects, features, aspects and advantages of bicycle component control devices disclosed herein will become apparent to those skilled in the art from the following detailed description, which, taken in conjunction with the annexed drawings, discloses preferred embodiments.

BRIEF DESCRIPTION OF THE DRAWINGS

Referring now to the attached drawings which form apart of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
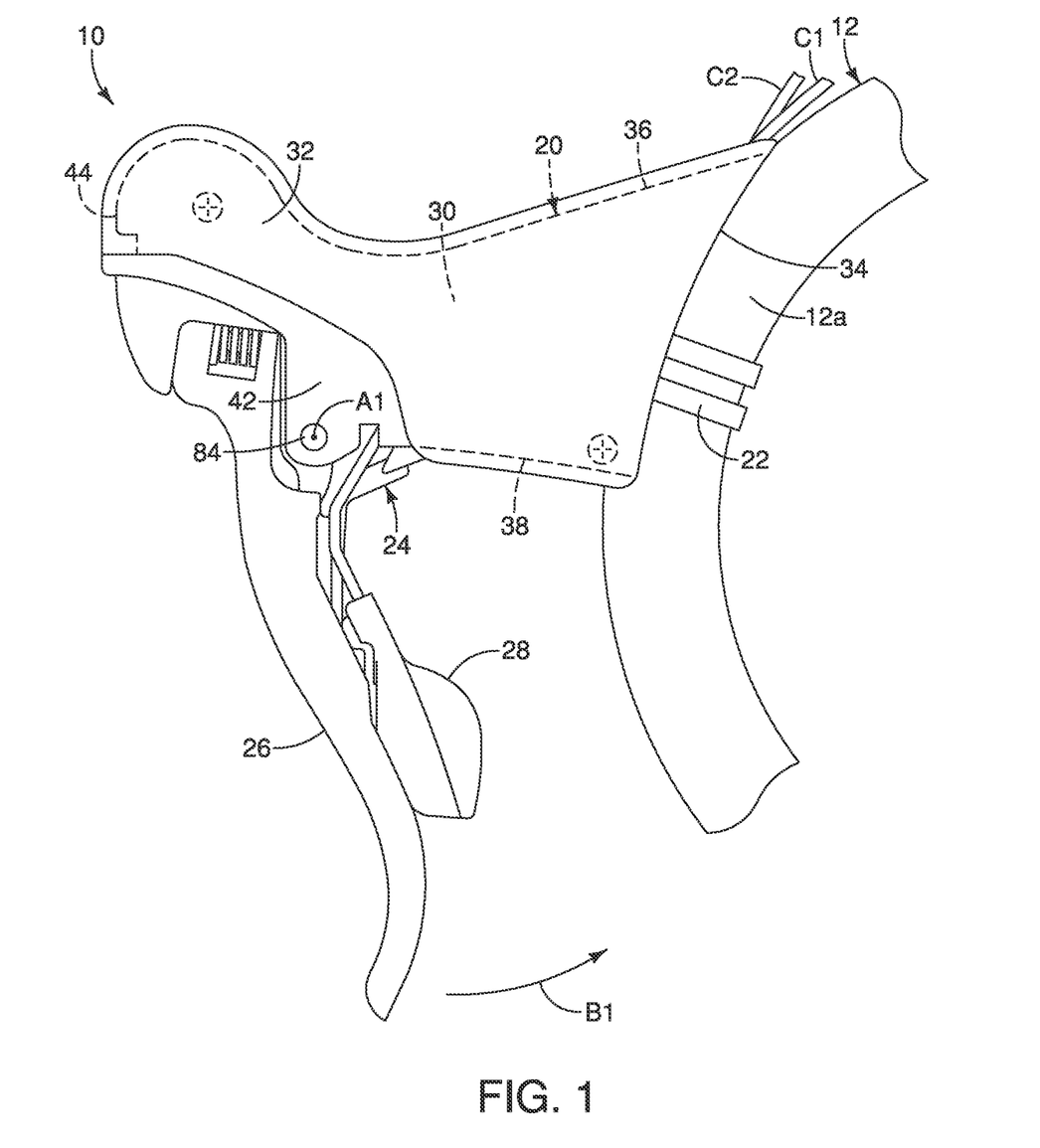
FIG. 1 is an inside elevational view of a bicycle component control device in accordance with a first embodiment.

Referring initially to FIG. 1, a bicycle component control device 10 is illustrated in accordance with a first embodiment. The bicycle component control device 10 is mounted on a drop down handlebar 12. In the illustrated embodiment, the bicycle component control device 10 is a road bicycle brake/shift device. The bicycle component control device 10 is a right hand side control device operated by the rider's right hand to operate a first brake device (not shown) and a first gear shifting device (not shown, e.g., a cable operated rear derailleur). It will be apparent to those skilled in the art that the configuration of the bicycle component control device 10 can be adapted to a left hand side control device that is operated by the rider's left hand.

As used herein to describe the above embodiment(s), the following directional terms "upper", "lower", "forward", "rearward", "above", "downward", "vertical", "horizontal", "below" and "transverse" as well as any other similar directional terms refer to those directions of a bicycle equipped with the bicycle component control device. Accordingly, these terms, as utilized to describe the bicycle component control device should be interpreted relative to a bicycle equipped with the bicycle component control device as used in the normal riding position on a horizontal surface in an upright position. Finally, terms of degree such as "substantially", "about" and "approximately" as used herein mean a reasonable amount of deviation of the modified term such that the end result is not significantly changed.

As seen in FIGS. 1 to 4, the bicycle component control device 10 basically includes a bracket 20, a clamp 22 and a bicycle component operating unit 24 with a pair of operating members 26 and 28. As discussed below, the clamp 22 is fixed to the bracket 20 for attaching the bracket 20 to a curved portion 12a of the handlebar 12. The bicycle component operating unit 24 is disposed inside the bracket 20 and the operating members (operators) 26 and 28 protrude out of the bracket 20. In the first illustrated embodiment, the bicycle component operating unit 24 is a mechanical shifting unit. However, the bicycle component operating unit 24 is not limited to a mechanical shifting unit. Rather, as will become apparent from the later embodiments, the bicycle component operating unit 24 can be an electric control unit (controller) that is either a non-shifting control unit or an electric shift unit. Moreover, the bicycle component operating unit 24 can be a hydraulic brake unit. In addition, the bracket 20 can also be configured to support two or more operating units such as, but not limited to, a hydraulic brake unit, a mechanical shifting unit, a non shifting control unit and an electric shift unit.

As seen in FIG. 1, the bracket 20 has a gripping portion 30 disposed between a pivot axis A1 of the operating member 26 and the clamp 22. Typically, the bracket 20 is made of a rigid, hard material. Thus, a grip cover 32 is stretched over at least the gripping portion 30 of the bracket 20 to provide a cushion to the portion 30 of the bracket 20 and to provide an attractive appearance. Typically, the grip cover 32 is made of elastic material such as rubber.

Figure 2:
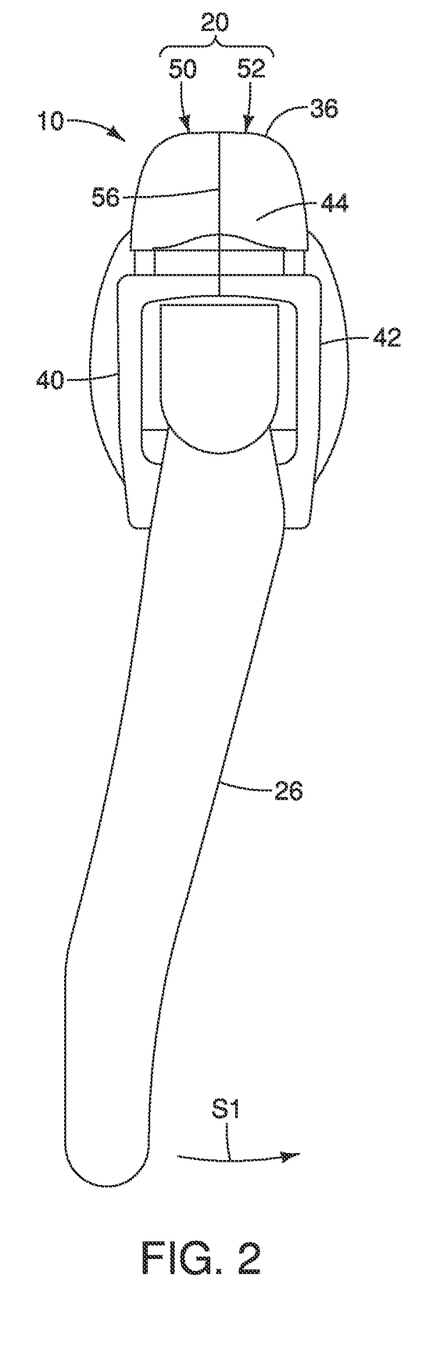
FIG. 2 is a front elevational view of the bicycle component control device illustrated in FIG. 1 with the brake/shift operating lever and the shift (release) lever in their rest positions.
Figure 3:
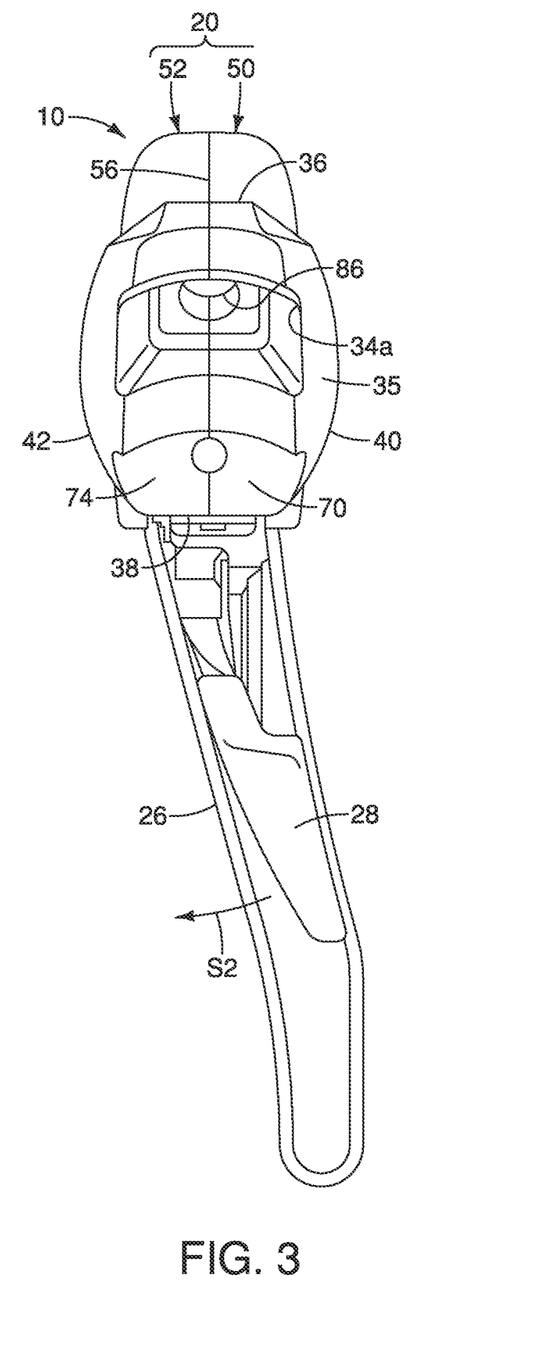
FIG. 3 is a rear elevational view of the bicycle component control device illustrated in FIGS. 1 and 2 with the brake/shift operating lever and the shift (release) lever in their rest positions.
Figure 4:
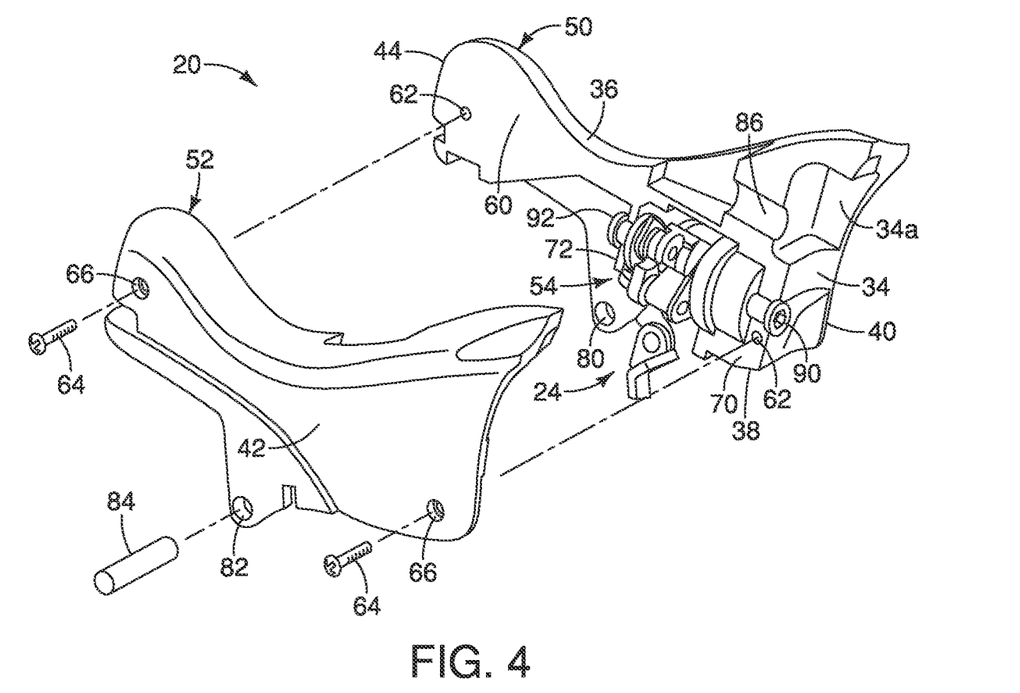
FIG. 4 is an exploded perspective view of the bicycle component control device illustrated in FIGS. 1 to 3.
Figure 5:
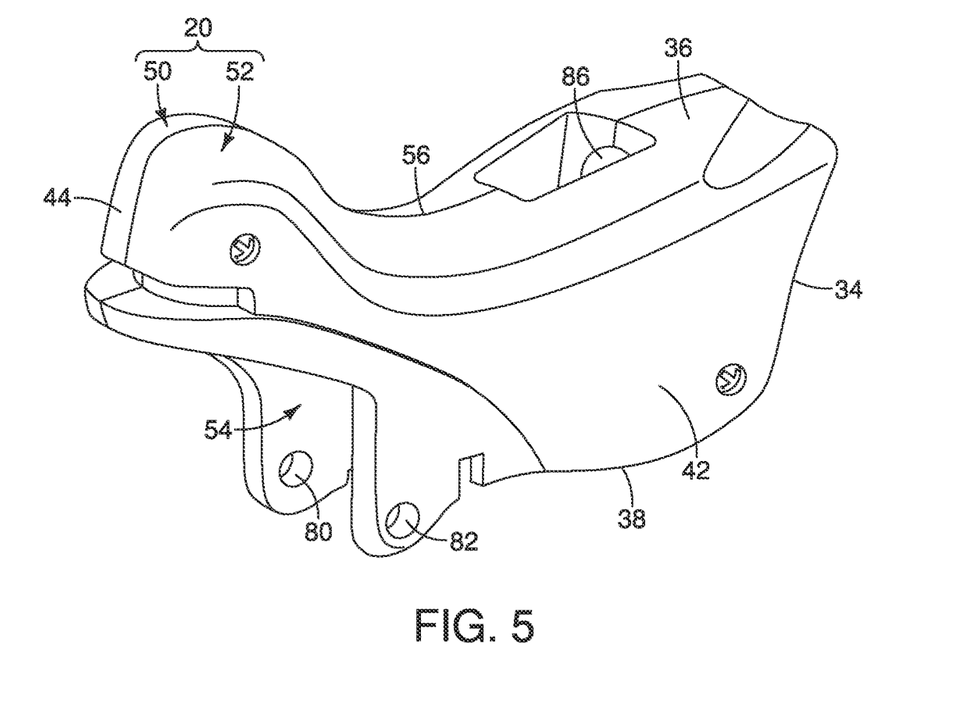
FIG. 5 is a perspective view of the bracket that supports the bicycle component operating unit of the bicycle component control device illustrated in FIGS. 1 to 4.
Figure 6:
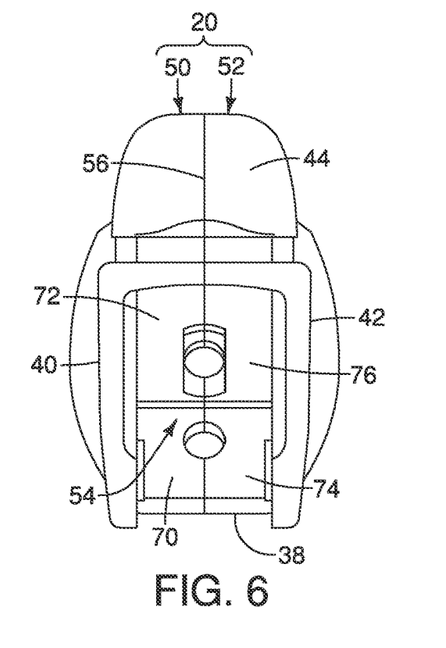
FIG. 6 is a front elevational view of the bracket illustrated in FIG. 5 for supporting the bicycle component operating unit illustrated in FIGS. 1 to 4.
Figure 7:
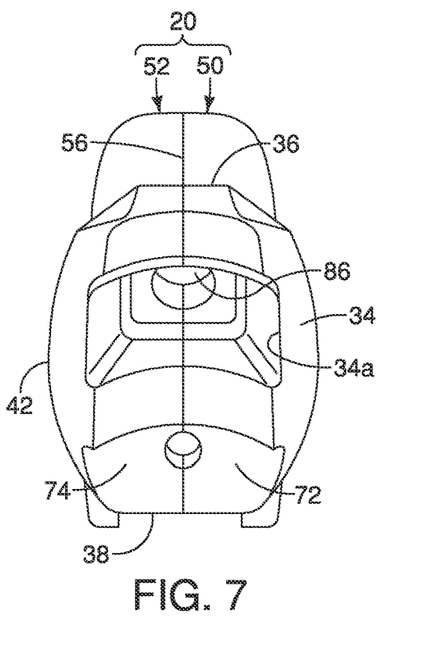
FIG. 7 is a rear elevational view of the bracket illustrated in FIGS. 5 and 6 for supporting the bicycle component operating unit illustrated in FIGS. 1 to 4.
Figure 8:
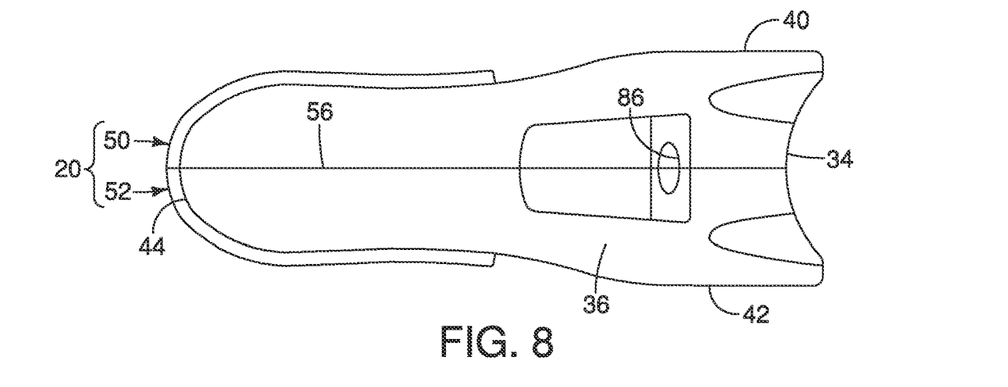
FIG. 8 is a top plan view of the bracket illustrated in FIGS. 5 to 7 for supporting the bicycle component operating unit illustrated in FIGS. 1 to 4.
Figure 9:
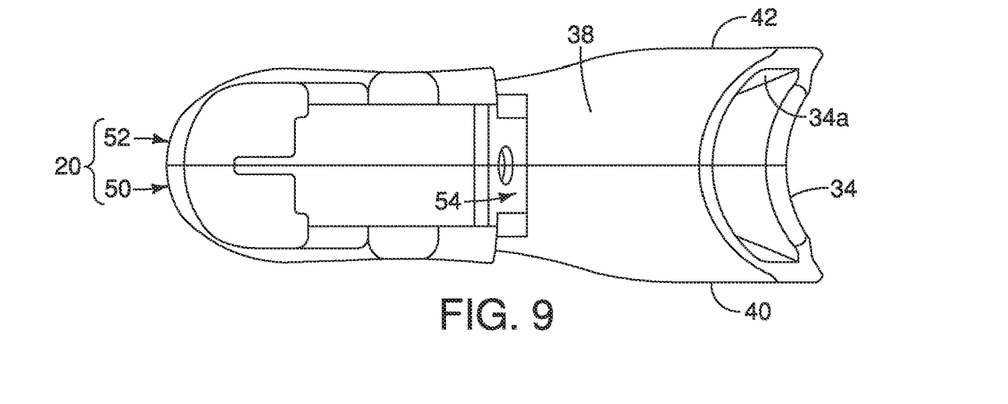
FIG. 9 is a bottom plan view of the bracket illustrated in FIGS. 5 to 8 for supporting the bicycle component operating unit illustrated in FIGS. 1 to 4.
Figure 10:
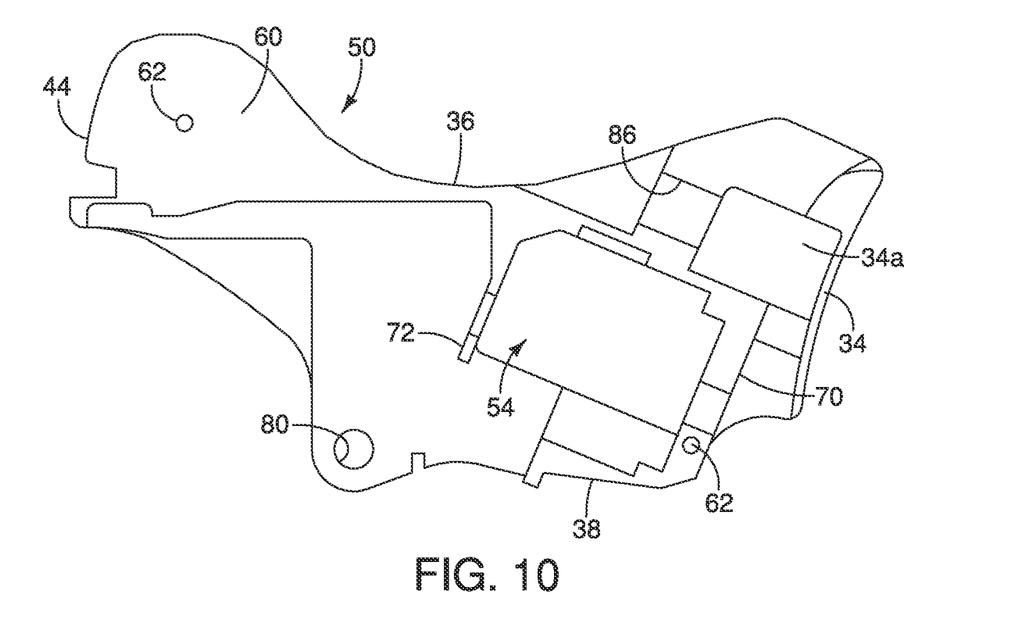
FIG. 10 is an interior side elevational view of the bracket illustrated in FIGS. 5 to 9 of one of the bracket parts for supporting the bicycle component operating unit illustrated in FIGS. 1 to 4.

Referring now to FIGS. 1 to 3, the bracket 20 has a mounting surface 34, an upper surface 36, a lower surface 38, a first side surface 40 and a second side surface 42. The mounting surface 34 has a recess 34a for receiving the clamp 22 for mounting the mounting surface 34 against the bicycle handlebar 12. Preferably, the mounting surface 34 has a generally curved configuration that mates with the curvatures of the curved portion 12a of the bicycle handlebar 12. The upper surface 36 extends from the mounting surface 34 to a free end 44 of the bracket 20. The lower surface 38 extends from the mounting surface 34 to the free end 44 of the bracket 20. The first side surface 40 extends from the mounting surface 34 to the free end 44 of the bracket 20 in the area between the upper and lower surfaces 36 and 38. The second side surface 42 extends from the mounting surface 34 to the free end 44 of the bracket 20 in the area between the upper and lower surfaces 36 and 38.

Referring now to FIGS. 4 to 10, the bracket 20 includes a first bracket part 50 and a second bracket part 52. The first and second bracket parts 50 and 52 are separate pieces from each other, and mate together to define an interior space 54. The interior space 54 is configured to constitute an operating unit receiving cavity. Thus, the bicycle component operating unit 24 is disposed in the interior space 54 formed between the first and second bracket parts 50 and 52 of the bracket 20. The first and second bracket parts 50 and 52 are non-movably fixed to each other for defining the interior space 54 therebetween such that the first and second bracket parts 50 and 52 both support the bicycle component operating unit 24.

The first and second bracket parts 50 and 52 are further configured relative to each other such that a connecting seam 56 is formed on the exterior surface of the bracket 20. In this first embodiment, the connecting seam 56 is formed between the first and second bracket parts 50 and 52 such that the connecting seam 56 separates the bracket 20 along the mounting surface 34, the upper surface 36, the lower surface 38 and the free end 44. However, as will be apparent from the later embodiments, the connecting seam 56 can have other configurations. For the purpose of strength and durability, the connecting seam 56 extends along at least three of mounting surface 34, the upper surface 36, the lower surface 38, the first side surface 40 and the second side surface 42.

In the first illustrated embodiment, the first and second bracket parts 50 and 52 are each made of a rigid, hard plastic material. Preferably, as illustrated, the first and second bracket parts 50 and 52 are formed by injection molding. Thus, the first and second bracket parts 50 and 52 are injection molded parts in the illustrated embodiment. More preferably, each of the first and second bracket parts 50 and 52 is formed using a draw molding machine using two molds or dies such that the first and second bracket parts 50 and 52 are formed without hidden surfaces. The draw direction refers to the direction in which the two molds or dies will separate to release from the bracket part 50 or 52 from the two molds or dies. The draw direction is also called a line of draw. In the context of injection molded parts, the term "hidden surface" refers to a surface of the injection molded part that cannot be seen while viewing the injection molded part in the draw direction. These hidden surfaces of the injection molded parts are often formed using slides that move into a cavity perpendicular to the draw direction for creating undercuts or overhanging features. Thus, as illustrated, the first and second bracket parts 50 and 52 are injection molded parts that have no hidden surfaces with respect to the draw direction. In this way, the molds or dies can be relatively simple, and the bracket part 50 or 52 can be easily ejected from the molds or dies.

In the illustrated embodiment, the first and second bracket parts 50 and 52 are mirror images of each other, except that the first bracket part 50 has an interior face 60 that has a pair of blind bores 62 for threadedly receiving a pair of fasteners or screws 64, respectively, while the second bracket part 52 has a pair of stepped through bores 66 for receiving the fasteners 64 therethrough. Since the through bores 66 are stepped, the head of the fasteners 64 are recessed from the exterior surface of the second bracket part 52. Thus, the first and second bracket parts 50 and 52 are non-movably fixed to each other by the fasteners 64. Of course, other types of fastening arrangements can be used to non-movably fix the first and second bracket parts 50 and 52 together as needed and/or desired.

In the first illustrated embodiment, the first bracket part 50 has a pair of support portions 70 and 72 that are configured and arranged to contact and support a first side of the bicycle component operating unit 24. Likewise, the second bracket part 52 has a pair of support portions 74 and 76 that are configured and arranged to contact and support a second side of the bicycle component operating unit 24. In the first illustrated embodiment, the support portions 70, 72, 74 and 76 constitute shaft engagement portions of the bracket 20.

In the first illustrated embodiment, the first bracket part 50 has a first pivot hole 80 and the second bracket part 52 has a second pivot hole 82. The first and second pivot holes 80 and 82 receive a pivot pin 84 that defines the pivot axis A1. The pivot pin 84 pivotally supports the operating member 26 to the bracket 20 for movement in a direction B1 (FIG. 1).

The clamp 22 is a conventional handlebar clamp that is often used for road style shifters. In the first illustrated embodiment, the clamp 22 is sandwiched between the first and second bracket parts 50 and 52. In particular, the first and second bracket parts 50 and 52 mate together to form the clamp receiving recess 34a, as mentioned above, and a bolt receiving recess 86.

In the first illustrated embodiment, the bicycle component operating unit 24 is a conventional mechanical shifting unit that pulls or releases a shift cable C1 (FIG. 1) that is connected to a gear shifting device. The operating member 26 is configured to perform a cable pulling operation, while the operating member 28 is configured to perform a cable releasing operation. Thus, the operating member 26 constitutes a pulling lever, while the operating member 28 constitutes a release lever. The operating member 26 is also configured to perform a braking operation by pulling a brake cable C2. Thus, the operating member 26 constitutes a brake/shift operating lever that functions as a brake lever by the rider pivoting the operating member 26 about the pivot axis A1 relative to the bracket 20 towards the curved portion 12a of the handlebar 12. As seen in FIGS. 2 and 3, operating members 26 and 28 are moved in a lateral direction towards a vertical longitudinal center plane of the bicycle to perform shifting operations. The bicycle component operating unit 24 has a pair of mounting fasteners 90 and 92 that are supported by the support portions 70, 72, 74 and 76 of the first and second bracket parts 50 and 52. The mounting fasteners 90 and 92 are fixed to a main axle structure of the bicycle component operating unit 24. The first and second bracket parts 50 and 52 can be provided with other structures that cooperate with the bicycle component operating unit 24 to aid in supporting and/or the operation of the bicycle component operating unit 24 as needed and/or desired.

It will be apparent from this disclosure that any type of mechanical shifting unit can be used with the bracket 20 by reconfiguring the interior space 54 to match the configuration of the mechanical shifting unit. Thus the bicycle component operating unit 24 will not be discussed in further detail herein.

Figure 11:
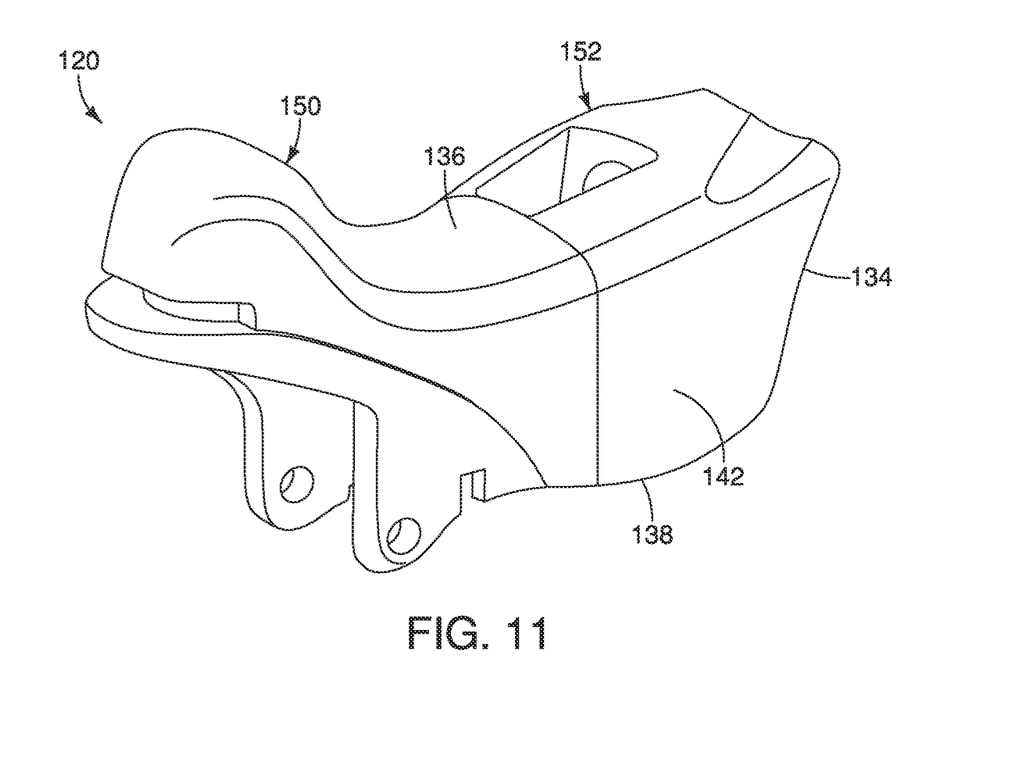
FIG. 11 is a perspective view of a bracket in accordance with a second embodiment that supports the bicycle component operating unit illustrated in FIGS. 1 to 4.
Figure 12:
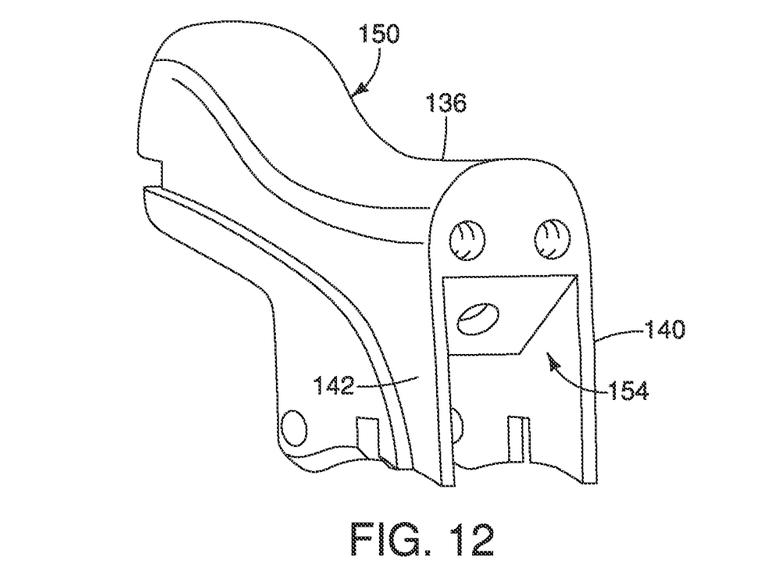
FIG. 12 is a perspective view of the first bracket part of the bracket illustrated in FIG. 11.
Figure 13:
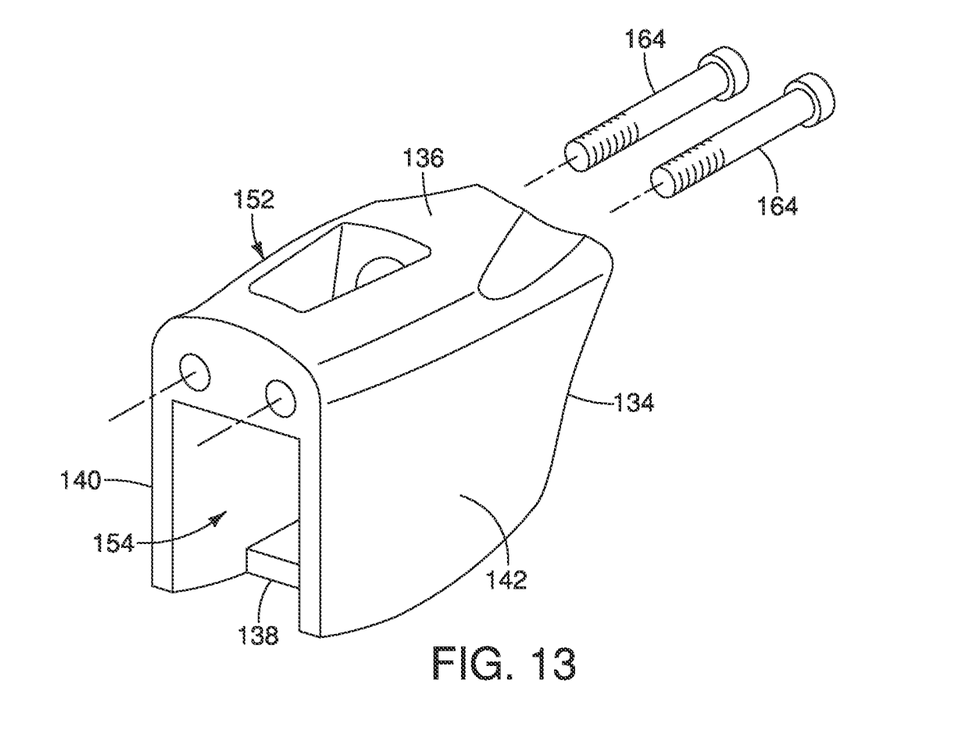
FIG. 13 is a perspective view of the second bracket part of the bracket illustrated in FIG. 11.

Referring now to FIGS. 11 to 13, a bracket 120 in accordance with a second embodiment will now be explained. The bracket 120 is configured to be used with the clamp 22 and the bicycle component operating unit 24 of the first embodiment. The bracket 120 has a mounting surface 134, an upper surface 136, a lower surface 138, a first side surface 140 and a second side surface 142. Here, the bracket 120 includes a first bracket part 150 and a second bracket part 152. The first and second bracket parts 150 and 152 are separate pieces from each other, and mate together to define an interior space 154. The first and second bracket parts 150 and 152 are non-movably fixed to each other by a pair of fasteners or screws 164. The first and second bracket parts 150 and 152 are further configured relative to each other such that a connecting seam 156 is formed on the exterior surface of the bracket 120. In this second embodiment, the connecting seam 156 is formed between the first and second bracket parts 150 and 152 such that the connecting seam 156 separates the bracket 120 along the upper surface 136, the lower surface 138 and the first and second side surfaces 140 and 142. When the first and second bracket parts 150 and 152 are fixed together, the bracket 120 is identical to the bracket 20 except for orientation of the connecting seam 156 and the fastening arrangement between the first and second bracket parts 150 and 152 using the fasteners or screws 164.

Figure 14:
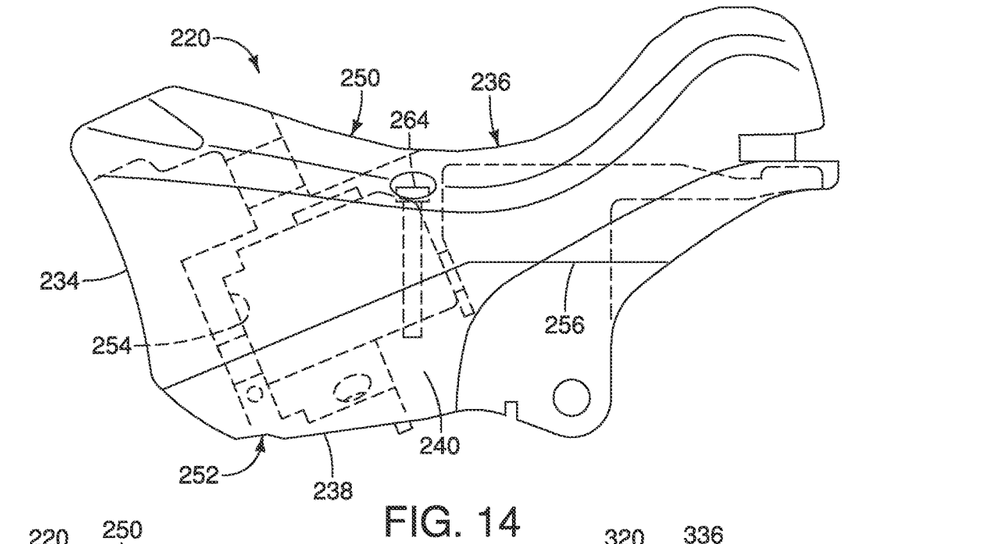
FIG. 14 is an outside elevational view of a bracket in accordance with a third embodiment that supports the bicycle component operating unit illustrated in FIGS. 1 to 4.
Figure 15:
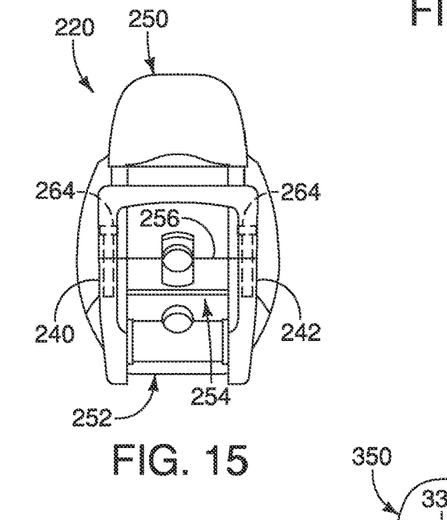
FIG. 15 is a front elevational view of the bracket that is illustrated in FIG. 14.

Referring now to FIGS. 14 and 15, a bracket 220 in accordance with a third embodiment will now be explained. The bracket 220 is configured to be used with the clamp 22 and the bicycle component operating unit 24 of the first embodiment. The bracket 220 has a mounting surface 234, an upper surface 236, a lower surface 238, a first side surface 240 and a second side surface 242. Here, the bracket 220 includes a first bracket part 250 and a second bracket part 252. The first and second bracket parts 250 and 252 are separate pieces from each other, and mate together to define an interior space 254. The first and second bracket parts 250 and 252 are non-movably fixed to each other by a pair of fasteners or screws 264. The first and second bracket parts 250 and 252 are further configured relative to each other such that a connecting seam 256 is formed on the exterior surface of the bracket 220. In this third embodiment, the connecting seam 256 is formed between the first and second bracket parts 250 and 252 such that the connecting seam 256 separates the bracket 220 along the mounting surface 234 and the first and second side surfaces 240 and 242. When the first and second bracket parts 250 and 252 are fixed together, the bracket 220 is identical to the bracket 20 except for orientation of the connecting seam 256 and the fastening arrangement between the first and second bracket parts 250 and 252 using the fasteners or screws 264.

Figure 16:
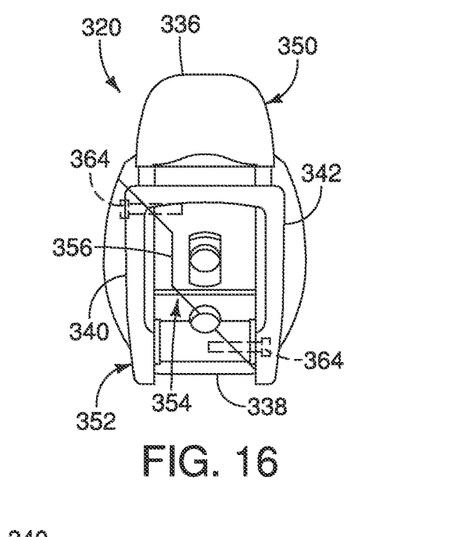
FIG. 16 is a front elevational view of a bracket in accordance with a fourth embodiment that supports the bicycle component operating unit illustrated in FIGS. 1 to 4.
Figure 17:
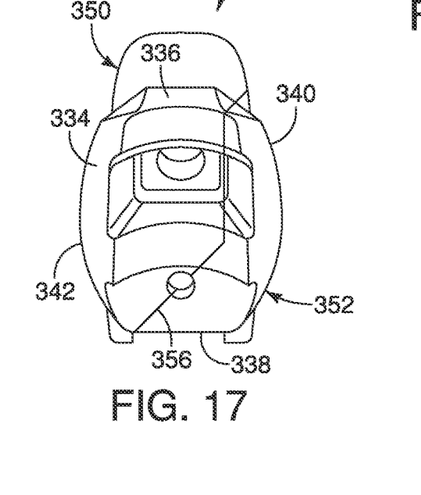
FIG. 17 is a rear elevational view of the bracket that is illustrated in FIG. 16.

Referring now to FIGS. 16 and 17, a bracket 320 in accordance with a fourth embodiment will now be explained. The bracket 320 is configured to be used with the clamp 22 and the bicycle component operating unit 24 of the first embodiment. The bracket 320 has a mounting surface 334, an upper surface 336, a lower surface 338, a first side surface 340 and a second side surface 342. Here, the bracket 320 includes a first bracket part 350 and a second bracket part 352. The first and second bracket parts 350 and 352 are separate pieces from each other, and mate together to define an interior space 354. The first and second bracket parts 350 and 352 are non-movably fixed to each other by a pair of fasteners or screws 364. The first and second bracket parts 350 and 352 are further configured relative to each other such that a connecting seam 356 is formed on the exterior surface of the bracket 320. In this fourth embodiment, the connecting seam 356 is formed between the first and second bracket parts 350 and 352 such that the connecting seam 356 separates the bracket 320 along the mounting surface 334, the lower surface 338 and the first side surface 340. Alternatively, the connecting seam can be formed such that the connecting seam separates the bracket 320 into two bracket parts such that the connecting seam separates the bracket 320 along the mounting surface 334, the upper surface 336 and the second side surface 342. When the first and second bracket parts 350 and 352 are fixed together, the bracket 320 is identical to the bracket 20 except for orientation of the connecting seam 356 and the fastening arrangement between the first and second bracket parts 350 and 352 using the fasteners or screws 364.

Figure 18:
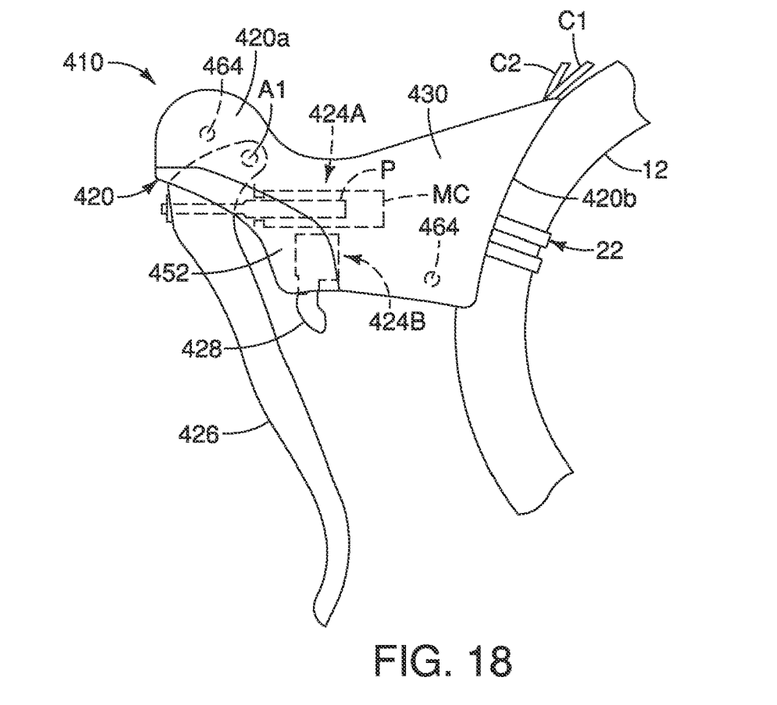
FIG. 18 is an inside elevational view of a bicycle component control device in accordance with a fifth embodiment.
Figure 19:
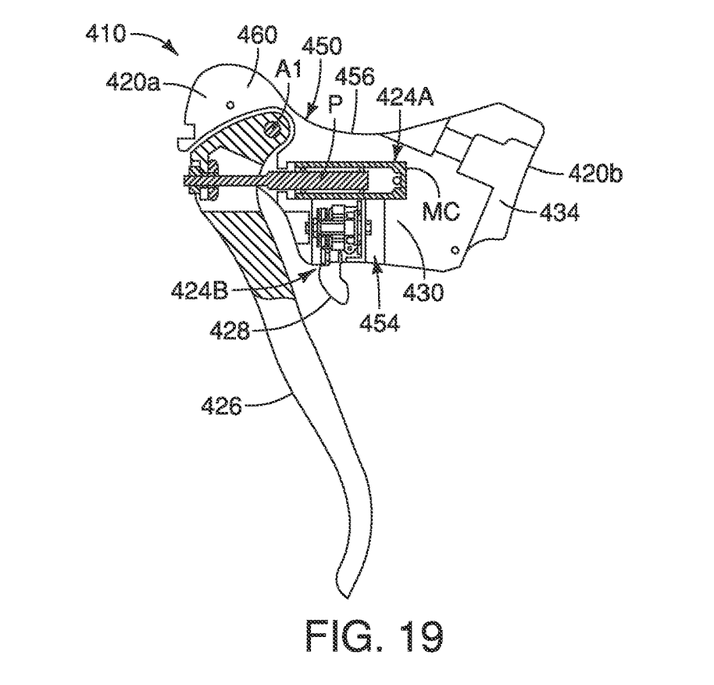
FIG. 19 is an interior side elevational view of the bracket illustrated in FIG. 18 of one of the bracket parts for supporting a hydraulic brake unit and a mechanical shifting unit.

Referring now to FIGS. 18 and 19, a bicycle component control device 410 in accordance with a fifth embodiment will now be explained. The bicycle component control device 410 has a bracket 420 is configured to be used with the clamp 22 of the first embodiment. The bracket 420 has a distal (first) end portion 420a and a proximal (second) end portion 420b. A gripping portion 430 is arranged between the distal end portion 420a and the proximal end portion 420b. The proximal end portion 420b has a mounting surface 434 with the clamp 22 being attached to the mounting surface 434. Thus, the clamp 22 is attached to the bracket 420 to mount the bracket 420 to the bicycle handlebar 12.

Here, the bracket 420 includes a first bracket part 450 and a second bracket part 452. The first and second bracket parts 450 and 452 are separate pieces from each other, and mate together to define an interior space 454. The first and second bracket parts 450 and 452 are non-movably fixed to each other by a pair of fasteners or screws 464. The first and second bracket parts 450 and 452 are further configured relative to each other such that a longitudinal connecting seam 456 (i.e., the outline of the interior face 460) is formed on the exterior surface of the bracket 420 as seen in FIG. 19. Basically, the longitudinal connecting seam 456 divides the bracket 420 in two halves that are basically mirrors images in the same manner as the first embodiment.

In this fifth embodiment, the first and second bracket parts 450 and 452 are further configured relative to each other to accommodate and support a hydraulic brake unit 424A and a mechanical shifting unit 424B. The hydraulic brake unit 424A is configured to operate a hydraulic brake device (not shown). The electric control unit 424B is configured to operate a bicycle electric device (not shown). Since the first and second bracket parts 450 and 452 can be configured to accommodate and support any hydraulic brake unit and any mechanical shifting unit, the hydraulic brake unit 424A and the mechanical shifting unit 424B will not be discussed and/or illustrated in detail herein. In other words, although the interior space 454 of the bracket 420 is different, the bracket 420 separates into two pieces in basically the same manner as the bracket 20, discussed above. Thus, each of the hydraulic brake unit 424A and the mechanical shifting unit 424B constitutes a bicycle component operating unit that is disposed in the interior space 454 of the bracket 420.

The hydraulic brake unit 424A includes an operating member or brake lever 426 that protrudes toward outside of the interior space 454 of the bracket 420. The hydraulic brake unit 424A includes a master cylinder MC and a piston member P. The master cylinder MC is disposed inside of the gripping portion 430 of the bracket 420. The piston member P is movably arranged in the master cylinder MC. In particular, the piston member P is moved toward the mounting surface 434 of the bracket 420 in response to operation of the operating member 426. The master cylinder MC of the hydraulic brake unit 424A is located rearward of the pivot axis A1 of the operating member 426 while the bicycle component control device 410 is in an installed position as seen in FIGS. 18 and 19. The operating member 426 is pivotally attached to the distal end portion 420a of the bracket 420 about a pivot axis A1 to operate the hydraulic brake unit 424A. Similarly, the mechanical shifting unit 424B includes an operating member or shift lever 428 that protrudes toward outside of the interior space 454 of the bracket 420. The operating member. Here the operating member or shift lever 428 performs both a cable pulling operation and a cable releasing operation of the mechanical shifting unit 424B.

Figure 20:
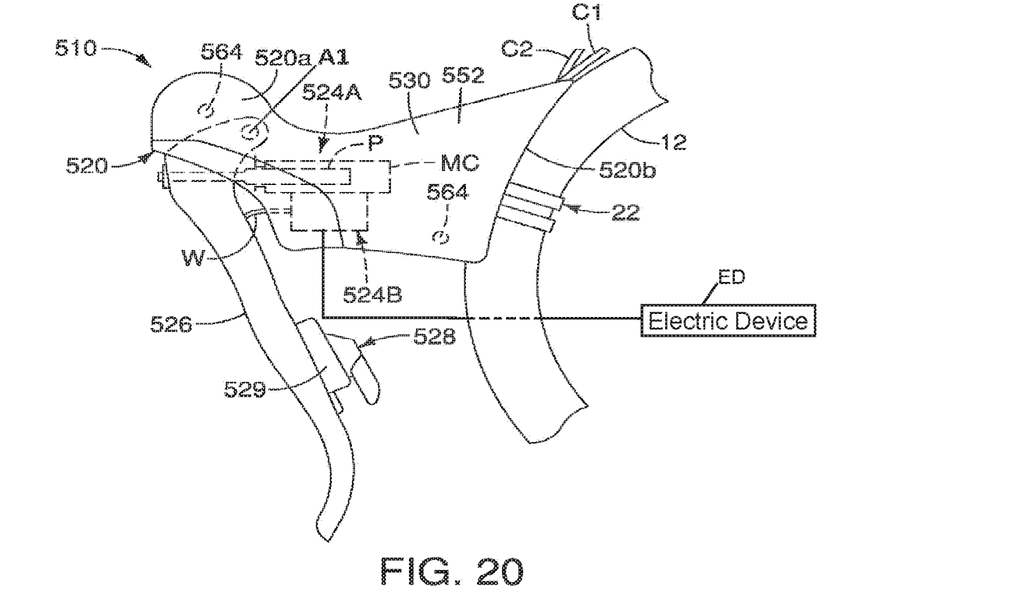
FIG. 20 is an inside elevational view of a bicycle component control device in accordance with a sixth embodiment.
Figure 21:
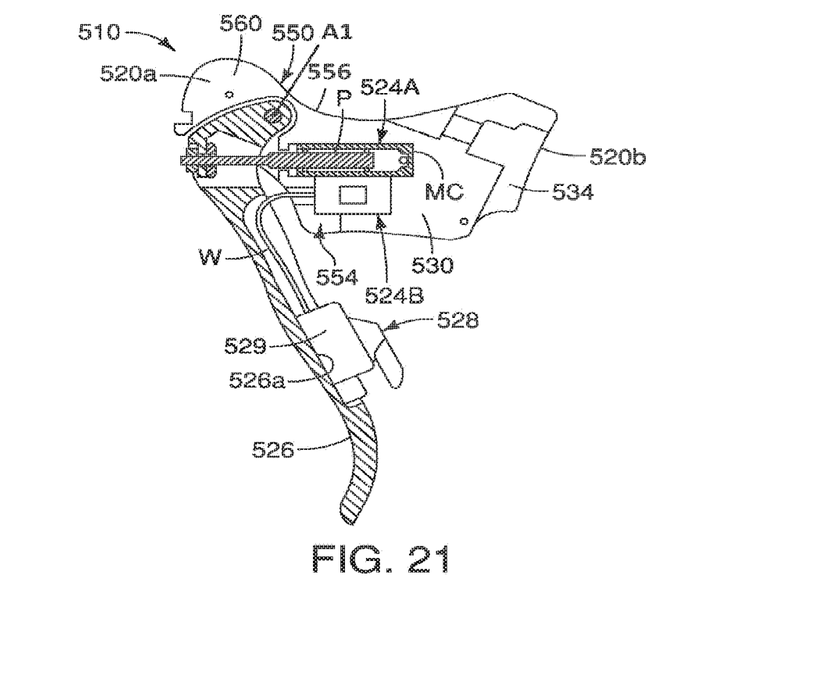
FIG. 21 is an interior side elevational view of the bracket illustrated in FIG. 20 of one of the bracket parts for supporting a hydraulic brake unit and an electric control unit that can be either an electric shift unit or a non-shining control unit.

Referring now to FIGS. 20 and 21, a bicycle component control device in accordance with a sixth embodiment will now be explained. The bicycle component control device 510 has a bracket 520 that is configured to be used with the clamp 22 of the first embodiment. The bracket 520 has a distal (first end portion 520a and a proximal (second) end portion 520b. A gripping portion 530 is arranged between the distal end portion 520a and the proximal end portion 520b. The proximal end portion 520b has a mounting surface 534 with the clamp 22 being attached to the mounting surface 534. Thus, the clamp 22 is attached to the bracket 520 to mount the bracket 520 to the bicycle handlebar 12.

Here, the bracket 520 includes a first bracket part 550 and a second bracket part 552. The first and second bracket parts 550 and 552 are separate pieces from each other, and mate together to define an interior space 554. The first and second bracket parts 550 and 552 are non-movably fixed to each other by a pair of fasteners or screws 564. The first and second bracket parts 550 and 552 are further configured relative to each other such that a longitudinal connecting seam 556 (i.e., the outline of the interior face 560) is formed on the exterior surface of the bracket 520 as seen in FIG. 21. Basically, the longitudinal connecting seam 556 divides the bracket 520 in two halves that are basically mirrors images in the same manner as the first embodiment.

In this sixth embodiment, the first and second bracket parts 550 and 552 are further configured relative to each other to accommodate and support a hydraulic brake unit 524A and an electric control unit 524B that can be either an electric shift unit or a non-shifting control unit. The hydraulic brake unit 524A is configured to operate a hydraulic brake device (not shown). The electric control unit 524B is configured to operate a bicycle electric device (ED), Since the first and second bracket parts 550 and 552 can be configured to accommodate and support any hydraulic brake unit and any electric control unit, the hydraulic brake unit 524A and the electric control unit 524B will not be discussed and/or illustrated in detail herein. In other words, although the interior space 554 of the bracket 520 is different, the bracket 520 separates into two pieces in basically the same manner as the bracket 20, discussed above. Thus, each of the hydraulic brake unit 524A and the electric control unit 524B constitutes a bicycle component operating unit that is disposed in the interior space 554 of the bracket 520.

The hydraulic brake unit 524A includes an operating member or brake lever 526 that protrudes toward outside of the interior space 554 of the bracket 520. The hydraulic brake unit 524A includes a master cylinder MC and a piston member P. The master cylinder MC is disposed inside of the gripping portion 530 of the bracket 520. The piston member P is movably arranged in the master cylinder MC. In particular, the piston member P is moved toward the mounting surface 534 of the bracket 520 in response to operation of the operating member 526. The master cylinder MC of the hydraulic brake unit 524A is located rearward of the pivot axis A1 of the operating member 526 while the bicycle component control device 510 is in an installed position as seen in FIGS. 20 and 21. The operating member 526 is pivotally attached to the distal end portion 520a of the bracket 520 about the pivot axis A1 to operate the hydraulic brake unit 524A. Similarly, the electric control unit 524B includes an operating member or shift lever 528 that is located on the operating member 526, and thus, protrudes outside of the interior space 554 of the bracket 520. More specifically, the electric control unit 524B includes a switch unit 529. The operating member 526 is operatively connected to the switch unit 529. The operating member 526 is a brake lever having a unit mounting surface 526a that faces the bicycle handlebar 12 while the bicycle component control device 510 is in an installed position. The switch unit 529 is mounted on the unit mounting surface 526a as seen in FIG. 21. Here, the operating member lever 528 is mounted on the switch unit 529 that performs both an upshifting operation by rotating the operating member lever 528 in a first direction and a downshifting operation by rotating the operating member lever 528 in a second (opposite) direction. The switch unit 529 is disposed outside of the bracket 520, while the electric control unit 524B is disposed inside of the bracket 520. An electrical wire W electrically connects a main part of the electric control unit 524B to the switch unit 529.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the connecting seam can be changed so long as the connecting seam extends along at least three of the mounting surface, the upper surface, the lower surface, the first side surface and the second side surface. For example, in the fifth and sixth embodiments, the bracket parts can be divides such that the connecting seam is similar to any one of the second, third or fourth embodiments. In the case of the fourth embodiment, the connecting seam can separate the bracket along one of the first and second side surfaces, one of the upper and lower surfaces, and the mounting surface as needed and/or desired. Thus, the foregoing descriptions of the embodiments according to the present invention are provided for illustration only, and not for the purpose of limiting the invention as defined by the appended claims and their equivalents.

What is claimed is:

1. A bicycle component control device comprising:
   a bracket having a first part, a second part, a distal end portion, a proximal end portion and a gripping portion arranged between the distal end portion and the proximal end portion, the proximal end portion having a mounting surface facing a bicycle handlebar, the first and second parts of the bracket define the proximal end portion having the mounting surface facing the bicycle handlebar;
   an operator pivotally attached to the distal end portion of the bracket about a pivot axis;
   a hydraulic brake unit operatively mounted on the bracket and configured to operate a hydraulic brake device, the hydraulic brake unit having a piston member moved toward the mounting surface in response to operation of the operator; and
   an electronic controller at least partly and operatively mounted on the bracket such that at least a portion of the electronic controller is disposed between the hydraulic brake unit and a lower edge of the bracket; wherein
   the electronic controller includes a switch unit, the switch unit is mounted on the operator,
   the second part of the bracket configured to detachably attach to the first part of the bracket such that the first part and the second part at least partly cover the electronic controller, and the first and second parts defining an interior space with the electronic controller being at least partly disposed in the interior space of the bracket.

2. The bicycle component control device according to claim 1, wherein
   the switch unit is disposed outside of the bracket.

3. The bicycle component control device according to claim 2, wherein
   the operator is a brake lever having a unit mounting surface facing the bicycle handlebar while the bicycle component control device is in an installed position, the switch unit is mounted on the unit mounting surface.

4. The bicycle component control device according to claim 2, wherein
   the electronic controller includes an operator operatively connected to the switch unit.

5. The bicycle component control device according to claim 4, wherein
   the master cylinder is disposed inside of the gripping portion of the bracket.

6. The bicycle component control device according to claim 4, wherein
   the master cylinder is located rearward of the pivot axis of the operator while the bicycle component control device is in an installed position.

7. The bicycle component control device according to claim 1, wherein
   the hydraulic brake unit includes a master cylinder, the piston member is movably arranged in the master cylinder.

8. The bicycle component control device according to claim 1, further comprising
   a clamp attached to the mounting surface of the bracket.

9. A bicycle component control device comprising:
   a bracket having a gripping portion, a first part and a second part, the first and second parts of the bracket define a proximal end portion of the bracket having a mounting surface configured to face a bicycle handlebar;

an operator pivotally attached to the bracket about a pivot axis;

a hydraulic brake unit operatively mounted on the bracket and configured to operate a hydraulic brake device, the hydraulic brake unit having a master cylinder located rearward of the pivot axis of the operator while the bicycle component control device is in an installed position; and an electronic controller at least partly and operatively mounted on the bracket such that at least a portion of the electronic controller is disposed between the hydraulic brake unit and a lower edge of the bracket; wherein the electronic controller includes a switch unit, the switch unit is mounted on the operator, the second part of the bracket configured to detachably attach to the first part of the bracket such that the first part and the second part at least partly cover the electronic controller, and the first and second parts defining an interior space with the electronic controller being at least partly disposed in the interior space of the bracket.

10. The bicycle component control device according to claim 9, wherein the electronic controller includes a switch unit disposed outside of the bracket.

11. The bicycle component control device according to claim 10, wherein the operator is a brake lever having a unit mounting surface facing the bicycle handlebar while the bicycle component control device is in an installed position, the switch unit is mounted on the unit mounting surface.

12. The bicycle component control device according to claim 10, wherein the electronic controller includes an operator operatively connected to the switch unit.

13. The bicycle component control device according to claim 9, wherein the master cylinder is disposed inside of the gripping portion of the bracket.

14. The bicycle component control device according to claim 9, wherein the bracket has a distal end portion, the gripping portion of the bracket is arranged between the distal end portion and the proximal end portion, the operator is pivotally attached to the distal end portion of the bracket.

15. The bicycle component control device according to claim 14, wherein the hydraulic brake unit has a piston member disposed in the master cylinder and moved toward the mounting surface in response to operation of the operator.

16. The bicycle component control device according to claim 15, further comprising a clamp attached to the mounting surface of the bracket.

* * * * *